US009813000B2

(12) United States Patent
Jabusch et al.

(10) Patent No.: US 9,813,000 B2
(45) Date of Patent: Nov. 7, 2017

(54) METHOD AND SYSTEM FOR ENHANCED ACCURACY OF CHEMICAL INJECTION PUMPS

(71) Applicant: Sirius Instrumentation and Controls Inc., Edmonton (CA)

(72) Inventors: Kirby Jabusch, Edmonton (CA); Colin Bussiere, Ardrossan (CA)

(73) Assignee: SIRIUS INSTRUMENTATION AND CONTROLS INC., Edmonton (CA)

( * ) Notice: Subject to any disclaimer, the term of this patent is extended or adjusted under 35 U.S.C. 154(b) by 0 days.

(21) Appl. No.: 14/974,709

(22) Filed: Dec. 18, 2015

(65) Prior Publication Data
US 2017/0179856 A1    Jun. 22, 2017

(51) Int. Cl.
G05B 11/28      (2006.01)
H02P 6/08       (2016.01)
F04D 25/06      (2006.01)

(52) U.S. Cl.
CPC ............... H02P 6/08 (2013.01); F04D 25/06 (2013.01)

(58) Field of Classification Search
CPC .. H02P 7/06; H02P 27/04; H02P 27/06; H02P 6/00; H02M 3/24; G05F 1/10; G05B 11/28
USPC .......... 318/139, 400.01, 700, 701, 727, 799, 318/599, 811; 363/95, 97; 323/906; 307/44, 61, 85, 87; 417/1, 15, 17, 18, 45, 417/53, 63, 44.11
See application file for complete search history.

(56) References Cited

U.S. PATENT DOCUMENTS

| 3,932,792 A | 1/1976 | Massie |
| 4,102,610 A | 7/1978 | Taboada et al. |
| 4,268,224 A | 5/1981 | Breuer et al. |
| 4,494,180 A * | 1/1985 | Streater ................. H02M 3/10 318/801 |
| 6,121,739 A | 9/2000 | Haberlander |
| 6,457,944 B1 | 10/2002 | Haberlander et al. |
| 6,590,793 B1 * | 7/2003 | Nagao ..................... H02J 7/35 323/222 |
| 6,922,348 B2 * | 7/2005 | Nakajima ............. F04B 17/006 318/801 |
| 6,997,683 B2 | 2/2006 | Allington et al. |
| 7,542,261 B2 | 6/2009 | Livoti |
| 7,905,373 B2 | 3/2011 | Beavis et al. |

(Continued)

FOREIGN PATENT DOCUMENTS

| EP | 0 916 026 | 5/1999 |
| JP | 06-341406 | 12/1994 |

(Continued)

*Primary Examiner* — Antony M Paul
(74) *Attorney, Agent, or Firm* — Nixon & Vanderhye PC

(57) ABSTRACT

A method and system for maintaining consistent output for a pump powered by an electric motor, is provided, including: sending electrical measurements regarding power applied to the motor to a controller; determining if the electrical measurements indicate a power variation; changing the parameters of output from the motor to compensate for the variation. The system uses a controller configured to receive electrical measurements regarding power input to the motor, to determine if the electrical measurements indicate a power variation; and to change the parameters of output from the motor to compensate for the variation.

24 Claims, 7 Drawing Sheets

(56) References Cited

U.S. PATENT DOCUMENTS 8,899,450 B2   12/2014   Johansson et al.
2012/0326649 A1* 12/2012  Patanaik ................... H02J 1/14
                                                      318/453

FOREIGN PATENT DOCUMENTS

JP    2012-013055    1/2012
WO    2012/113578    8/2012

* cited by examiner

METHOD AND SYSTEM FOR ENHANCED ACCURACY OF CHEMICAL INJECTION PUMPS

FIELD OF THE INVENTION

This invention relates to apparatus for injecting a chemical into a process. More particularly the invention relates to improved controls for an electrical motor powered pump injecting a chemical into a process.

BACKGROUND

Motors, typically electric motors, are used to power pumps which inject chemicals into a process. A challenge with such motors is that the voltage delivered is not always consistent, causing the chemical output by the pump to vary. For example DC motors are commonly used to drive pumps. Some of these motors are powered by a solar power system and one or more batteries. When the batteries are low, for example due to days or nights in which no solar power is available, the voltage can drift down to, for example, about 12 volts. When the solar panel is charging the batteries when there is plentiful solar power, for example on sunny days, the voltage on the batteries can be higher, for example up to 13.5 volts. This difference in voltage, when applied to the DC motor driven pump system can result in a 10-15% difference in motor RPM, as the RPM of a DC motor is approximately proportional to the voltage applied. This in turn causes the delivery of inconsistent chemical rates to the process, which can vary by 10-15%. The result is a lower volume of injected chemical, for example at night, or a higher volume of injected chemical, for example during the sunny parts of days.

SUMMARY OF THE INVENTION

The system and method according to the invention provides for compensating for the change in voltage, current and/or other parameters which measure power supplied to the motor, and thereby maintain consistency of the chemical being injected into the process.

A system for and method of maintaining consistent output for a pump powered by an electric motor is provided. The method includes sending an electrical measurement of power applied to the motor to a controller; determining if the electrical measurement indicates a power variation; and changing a parameter of output from the motor to compensate for the power variation. The system may include: a pump; an electric motor configured to power the pump; and a controller configured to receive an electrical measurement regarding power input to the motor, to determine if the electrical measurement indicates a power variation; and to change a parameter of output to the motor to compensate for the power variation.

The electrical measurements of power applied to the motor may also indicate a variance in the loading condition of the motor. The controller can also determine if this load variance requires adjusting a parameter of output to the motor to compensate.

The pump may be a chemical pump and the electric motor may be powered by a battery.

The battery may be charged by solar. The motor may be a DC motor; an AC induction motor; a permanent magnet synchronous motor; or a brushless DC motor.

The electrical measurement may be a voltage measurement; which may be a current measurement or a frequency waveform. The parameter of output from the motor may be changed by changing a duty cycle of the motor; the duty cycle may be an ON/OFF duty cycle or a pulse width modulation duty cycle. The ramp down period of the motor and/or ramp up period of the motor may be considered when determining the parameter change.

The controller may include an analog to digital converter to convert the electrical signal to a digital signal. The motor may be calibrated to obtain a calibration factor, which is used when determining if a power variation has occurred.

DETAILED DESCRIPTION

Figure 1:
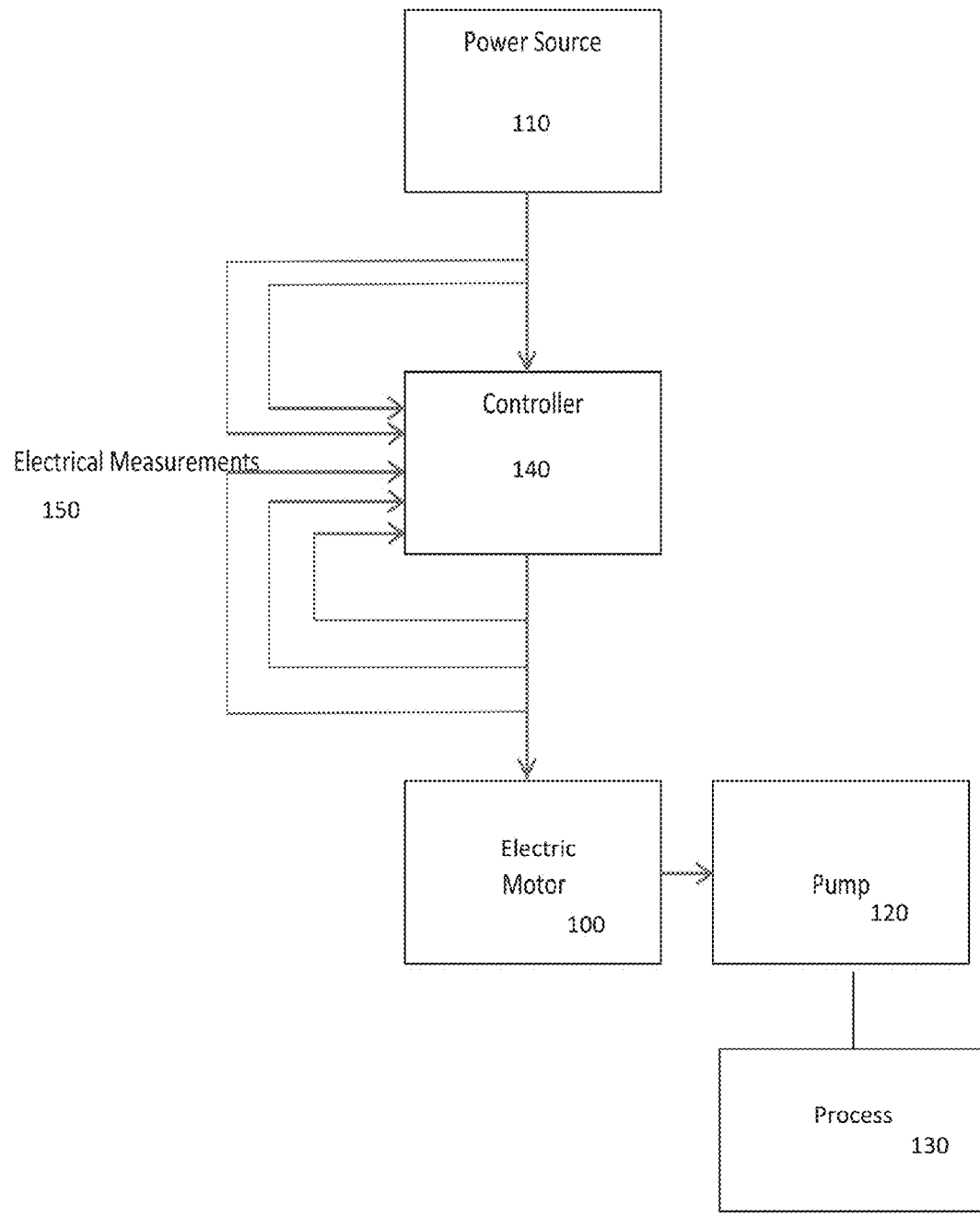
FIG. 1 is a block diagram showing an embodiment of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

Figure 8:
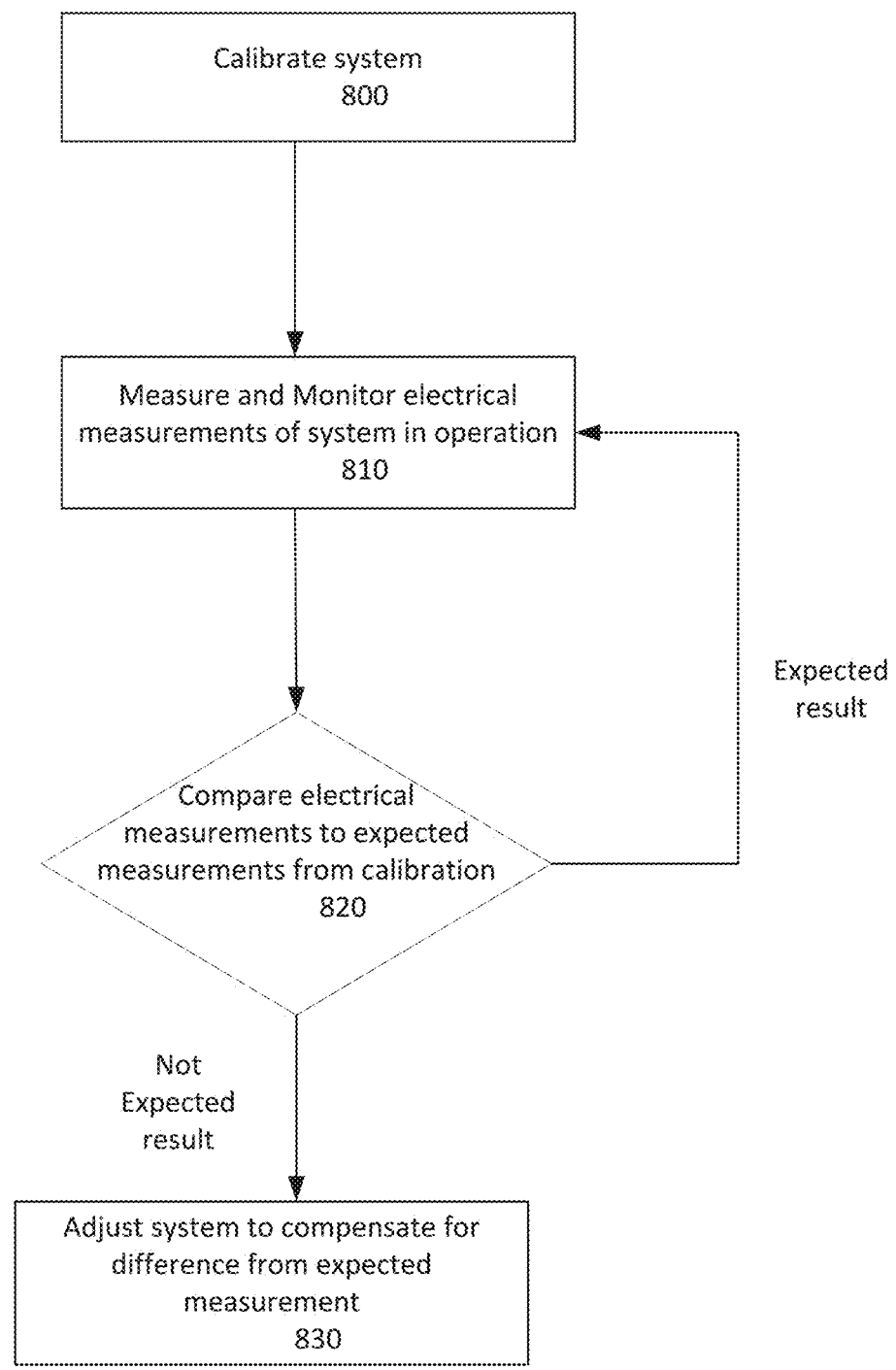
FIG. 8 is a flow chart showing an embodiment of the process according to the invention.

In the system and method according to the invention, and as shown in FIGS. 1 and 8, electric motor 100, powered by power source 110, is connected to and operates pump 120 that is configured to pump a chemical into process 130. Motor 100 may be, for example, one of the following types: DC Motor, AC Induction motor, permanent magnet synchronous motor (PMSM), or brushless DC motor (BLDC). Pump 120 may be, for example but not limited to, one of the following types of pumps: positive displacement piston driven, packed plunger, centrifugal, gear, vane, or diaphragm. Power source 110 may be for example, DC power from a battery or solar panel, DC power from battery, DC power from an engine skid, DC power from a thermoelectric generator, DC power from a fuel cell, DC generator, or alternator, or a combination of the above. Power source 110 may also be AC power from a generator, or power grid. Power source 110 may also be an invertor, which converts power from DC or another frequency. Many influences and variables external to the system shown in FIG. 1 may affect and alter the RPM, load, or efficiency of pump 120, and therefore the volume of chemical delivered to process 130. Process 130 may be, for example, an oil or gas well, pipeline, valve, choke, separator, tank, downhole, flowline, or wellhead.

An example of a variable that may impact delivery of the chemical to process 130 is a supply voltage increase, which may cause pump 120 to operate at a higher RPM and therefore deliver more chemical to process 130. Another example is temperature or pressure changes in process 130, which may cause pump 120 to respond to an increasing load by delivering less chemical. As pressure increases in process 130, motor 100 torque can increase and motor 100 run at a slower RPM resulting in less chemical output to process 130. By measuring and monitoring electrical measurements 150 (step 810 in FIG. 8), such as voltage, current, and frequency waveforms, which are provided to controller 140 or applied to motor 100, if an unexpected result is obtained relative to the expected calibrated result (step 820 in FIG. 8), then real time corrections can be made to compensate for variations in RPM, load, supply voltage, or pump efficiency (step 830 in FIG. 8) and a consistent volume of liquid can be delivered to process 130.

The system and method according to the invention relates to measuring supply and/or output voltage, current, and/or frequency waveforms provided to controller 140 or applied to motor 100. The measurements 150 are made between power source 110 and motor 100 and can be made either on the input or output of controller 140 or on both the input and output sides of the controller 140.

Figure 2:
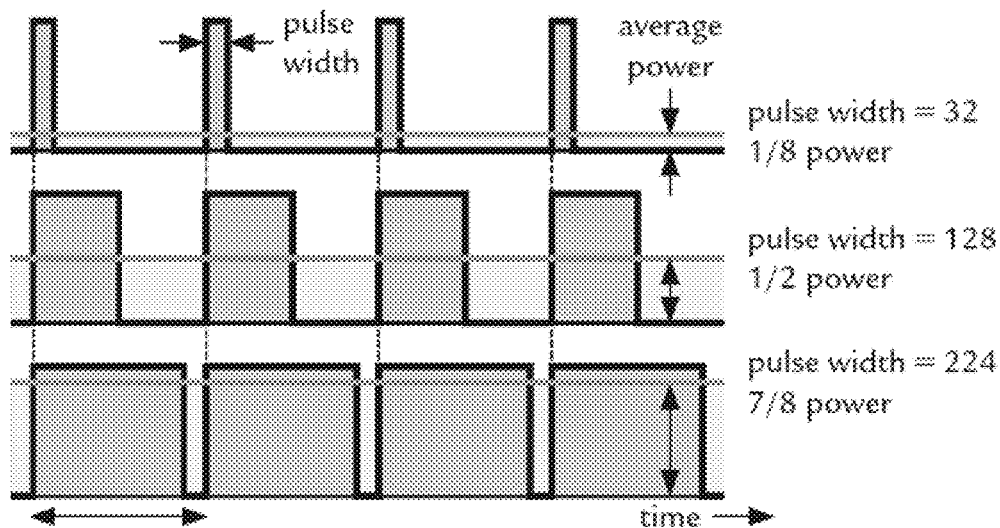
FIG. 2 is a graph showing embodiments of a pulse width power cycle.

In an embodiment of the invention, as shown in FIG. 2, controller 140 receives measurements of the supply voltage available from power source 110, such as a battery, and controller 140 is configured to apply a control algorithm that can change a parameter of output from the motor, for example by modulating the voltage to motor 100 with either a pulse width modulated (PWM) modulated waveform or a duty cycle control sent to motor 100, which can, in real time or near real time, compensate for a power variation, for example, by adjusting the PWM duty cycle or ON/OFF duty cycle to motor 100, and effectively operate motor 100 at a higher or lower average RPM or keep motor 100 running for a longer or shorter injection cycle. This adjustment to motor 100 would be in opposition to the voltage change of power source 110. For example, if the supplied voltage (Es) dropped by 5% from when pump 120 volume was setup and calibrated, the "ON" time (duty cycle) of motor 100 or RPM of motor 100 can be increased by the same 5% to compensate for the drop in supply voltage available to motor 100.

The duty cycle of an ON/OFF style control may be adjusted by controller 140. Average voltage applied to motor 100 is proportional to the duty cycle of the applied waveform. As the supply voltage is similar to the peak voltage in the waveform shown in FIG. 3, if the supply voltage drops by 10%, the duty cycle can be increased by 10% to deliver the same average voltage to a DC motor to maintain the same RPM.

Figure 3:
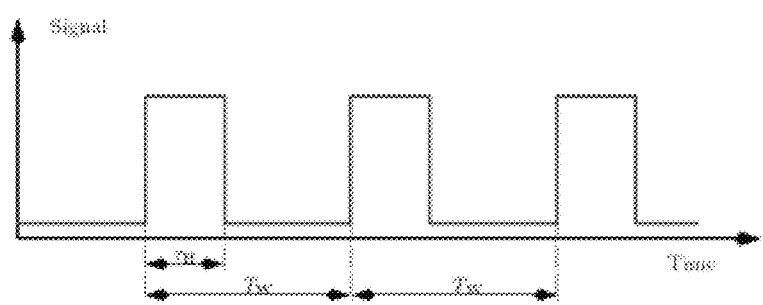
FIG. 3 is a graph showing an example of $_w$ and $T_H$ parameters of an ON/OFF power cycle.

For example, as shown in FIG. 3, the ON time ($T_H$) may be 10 seconds and the OFF time 50 seconds for a total injection cycle ($T_w$) of 60 seconds. This provides a (10/60), or 16.67% duty cycle, to motor 100. During the ON cycle motor 100 accelerates to full speed proportional to the applied voltage, and during the OFF cycle motor 100 slows down and stops. If the supply voltage drops by, for example, 10%, the ON time of motor 100 can be increased by 10% or changed to 11 seconds to have an effective ON time of 18.333% of the total injection cycle. This provides for keeping pump 120 turned on for a longer period during an ON cycle to compensate for a drop in supply voltage.

Figure 4:
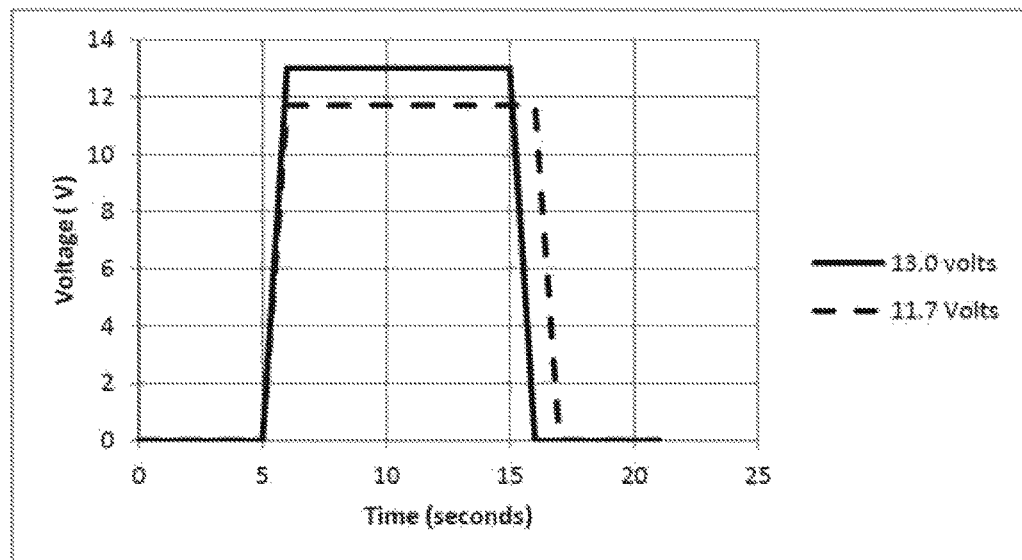
FIG. 4 is a graph showing an example of a change to an ON/OFF cycle.

FIG. 4 shows an example wherein the voltage from power source 110 has dropped from 13.0 volts to 11.7 volts. By extending the ON cycle by one second in the example shown, the output from pump 120 remains consistent.

Figure 5:
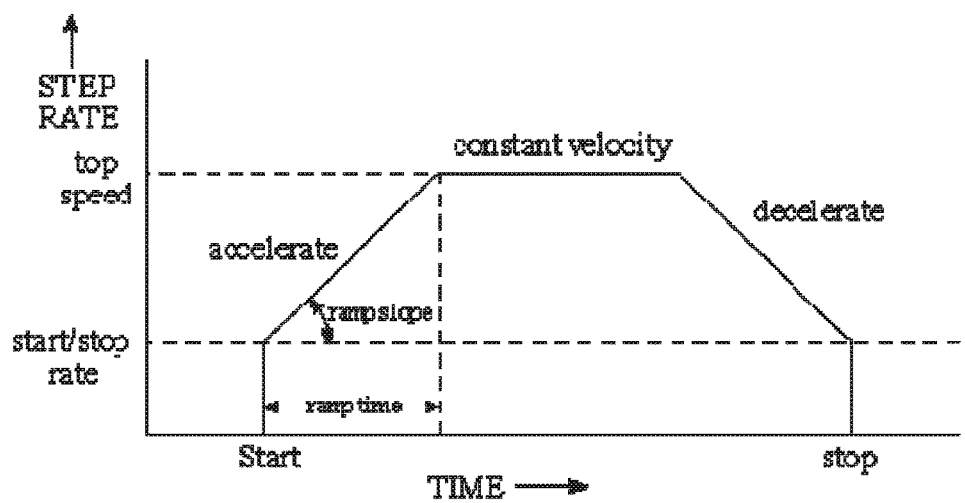
FIG. 5 is a graph showing an embodiment of an acceleration and deceleration process.

In an alternative embodiment of the above system, the voltage applied to motor 100 can be monitored to provide finer corrections and more accurate compensation, as shown in FIG. 5, which shows the voltage waveform applied during an ON cycle to motor 100. When voltage to motor 100 is stopped, motor 100 decelerates gradually (referred to as a "ramp down"). The voltage on motor 100 after the power is no longer applied is due to the generator effect or back emf (electro motive force or voltage) of motor 100 as it slows down. The voltage produced by motor 100 is a result of momentum and the rotational speed of the rotor. This ramp down process may take 0-5 seconds. Likewise, when motor 100 begins an ON cycle, it takes a period of time, for example 0 to 0.5 seconds, for motor 100 to accelerate to full speed (referred to as "ramping up").

In the case when the ON times are short, such as 2 seconds, the ramp up and ramp down times may contribute a significant amount of chemical to process 130 over many cycles. The slope of the ramp up and ramp down depends on many factors such as motor load (pressure), system momentum, inertia of the rotors and rotating mass within motor 100. By integrating the area under the graph, the volt-seconds applied to motor 100 can be measured. Integration of RPM or rotational velocity with respect to time (RPM-seconds) provides a determination of the number of rotations of motor 100 as the measurement of volt-seconds is proportional to and can provide a very close estimate of the number of rotations of motor 100; and hence the number of strokes of pump 120 can be calculated given the number of cylinders and gearing between motor 100 and pump 120.

Figure 9:
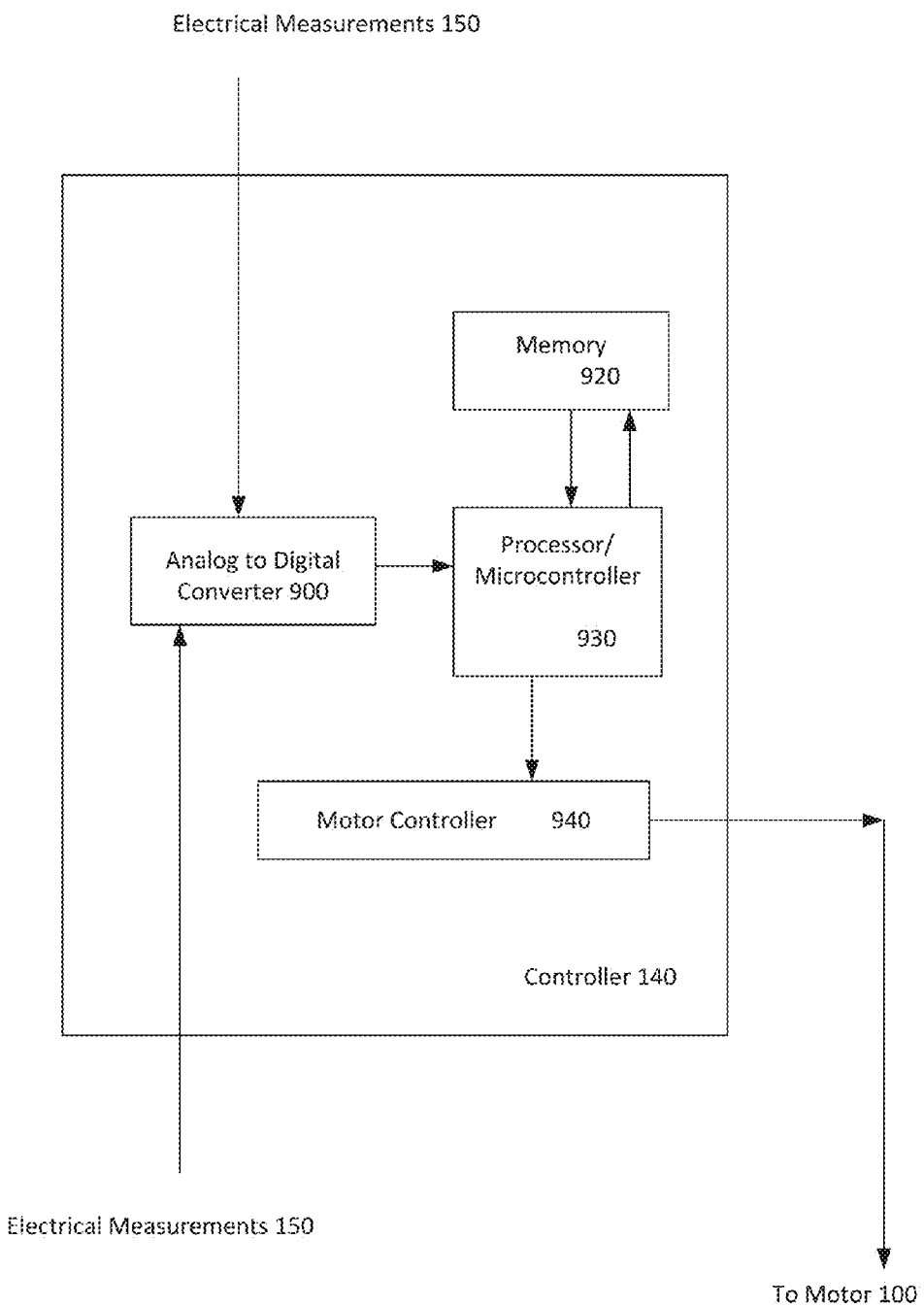
FIG. 9 is a block diagram of an embodiment of a controller according to the invention.

Controller 140, as shown in FIG. 9, includes analog to digital converter 900 to convert measurements, such as voltage, current, and frequency into a digital value with an analog to digital convertor 900; a processor or microcontroller 930 configured to receive this digitized information including electrical measurements of power source 110 and electrical measurements of the power applied to motor 100 and the back emf of motor 100; a motor controller 940 to instruct pump 120 and motor 100; and memory 920 for storing the measurements for later analysis. Motor controller 940 may include a mechanical or solid state switch, such as a relay, FET or IGBT to turn the motor on and off if motor 100 is a DC motor. Motor controller 940 may include a variable frequency invertor for controlling motor 100 if motor 100 is an AC motor.

The electrical measurements 150, such as voltage, can be made by directly by digitizing the voltage difference in potential between two points, or scaling down the voltage measurement proportionately with a resistive voltage divider network. If required, the voltage can be filtered prior to digitization. A current measurement can be converted to a voltage by a direct or indirect current sensor using resistive, magnetic or solid state means as listed below.

1. Resistive (Direct)
    a. Current Sense Resistors
    b. Inductor DC resistance
2. Magnetic (Indirect)
    a. Current Transformer
    b. Rogowski Coil
    c. Hall Effect Device
3. Transistor (Direct)
    a. RDS(ON)
    b. Ratio-metric A method to measure current is to measure the voltage drop across a small current sense resistor. The voltage measured is proportional to current using the standard I=V/R calculation.

A frequency measurement can be made by digitizing a voltage or current waveform. Also, frequency can be calculated by counting cycles, measuring the time period of one or more cycles, or by advanced Fourier transform and digital signal processing techniques.

The motor measurements of voltage and current can be made when motor 100 is stopped, accelerating, at full speed or at a partial speed, or when decelerating to a stop. Controller 140 may make a plurality of electrical measurements that may include some or all of the following: voltage, current, and frequency and period of the voltage and current waveforms. Controller 140 uses these measurements to calculate changes in motor speed, motor load, number of revolutions or pump strokes, and rate of injection; as the system is calibrated to a predetermined injection rate. Controller 140 can perform these measurements without making a direct measurement of actual motor RPM, pump strokes, or injected chemical volume, but only using the electrical measurements above.

Controller 140 uses electrical measurements 150 to determine if a variation in injected volume from pump 120 has occurred, and if so, the amount of such variation. Any detected variations in the electrical measurements 150 can imply a variation in pump 120 performance, efficiency, or speed and a corresponding adjustment can be made to the speed or duty cycle of the system to counter the variation. The adjustments can be made in real time or applied during the next or future injection cycles. The exact calculation is dependent on the motor 100 type, size, style and also the pump 120 type, size and style. In summary, any variation in calculated injection volume relating to changes in the electrical measurements 150 can be corrected for by controller 140.

A similar example can be constructed by examination of motor 100 load current. As the pressure in the process 130 changes, this give rise to a change in the pump 120 load and motor 100 torque. This change in torque can be detected by a variation in motor 100 current. Some motor 100 types, such as a DC motor, show a decreased RPM with increased motor 100 load; while other motor 100 types, like an induction motor, have lower RPM due to increased slip. The electrical measurements of motor 100 voltage, current, and frequency applied to motor 100 can indirectly be used to calculate the estimated variation in motor 100 load, pump 120 pressure, and the volume pumped. By understanding the response of the pump and motor to changes in injection rate with respect to pressure or load, an appropriate correction can be calculated. Corrections can them be made by controller 140 to adjust motor 100 speed or duty cycle to keep the injected volume constant.

Voltage Example

Figure 6A:
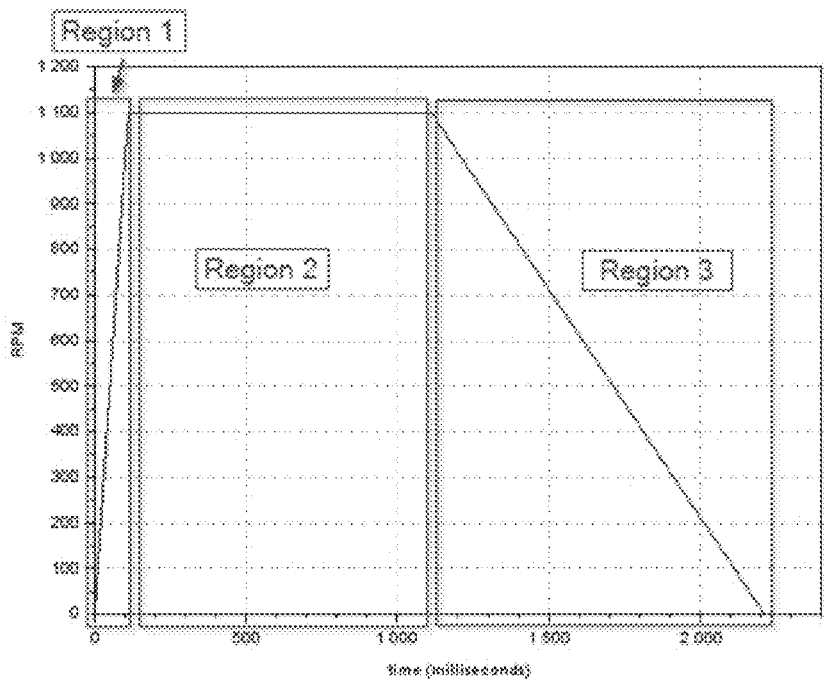
FIG. 6A is a graph showing an embodiment of Regions used in a time vs. RPM graph to calculate chemical output according to the invention.

The following example uses feedback of the voltage applied to motor 100 to correct for RPM changes and the resultant injection rate changes. Three operating regions are defined and analyzed as shown in FIG. 6A, namely:

Region 1—motor 100 ramp up while going from zero RPM to steady state RPM;

Region 2—steady state RPM during the normal injection ON cycle; and

Region 3—motor 100 ramp down after power is removed and the inertia of the system is decelerated by the work done by pump 120.

Similar regions may be considered for voltage instead of RPMs as described below. The accumulated contribution of each operating region results in the overall volume of chemical injected.

Figure 7:
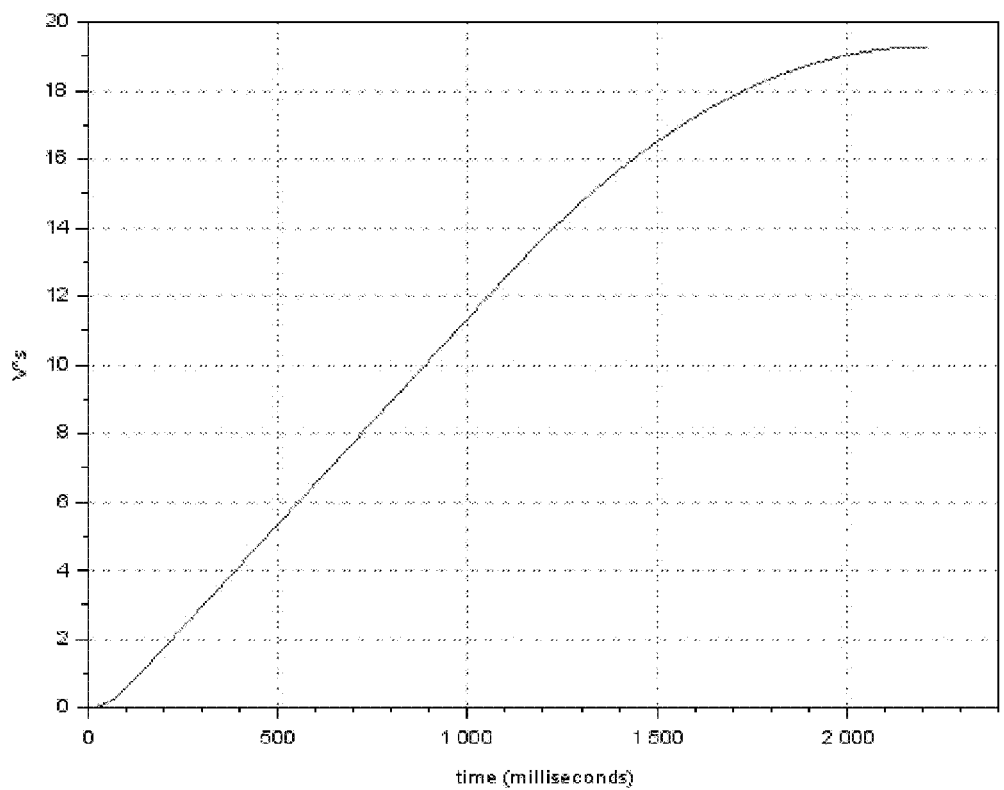
FIG. 7 is a graph showing an example of a relationship between time to $V*s$.

As shown in FIG. 8, the system first goes through a calibration process (step 800). The intent of the calibration process is to quantify the pumped volume while observing the voltage across motor 100. Voltage is proportional to RPM and RPM is in turn proportional to injection rate. This relationship will reveal a scale factor that relates voltage to injection rate. This scale factor is determined via calibration and yields a calibration factor. The net result is that motor voltage can now be directly related to pumping rate in any of the three regions of operation. This voltage based pumping rate is integrated to determine the volume pumped. The result of the integration is an expression of Volt*seconds (V*s) and is the parameter regulated to achieve the required volume injected. A graph showing an example of Volt*seconds from an injection cycle is shown in FIG. 7.

Figure 6B:
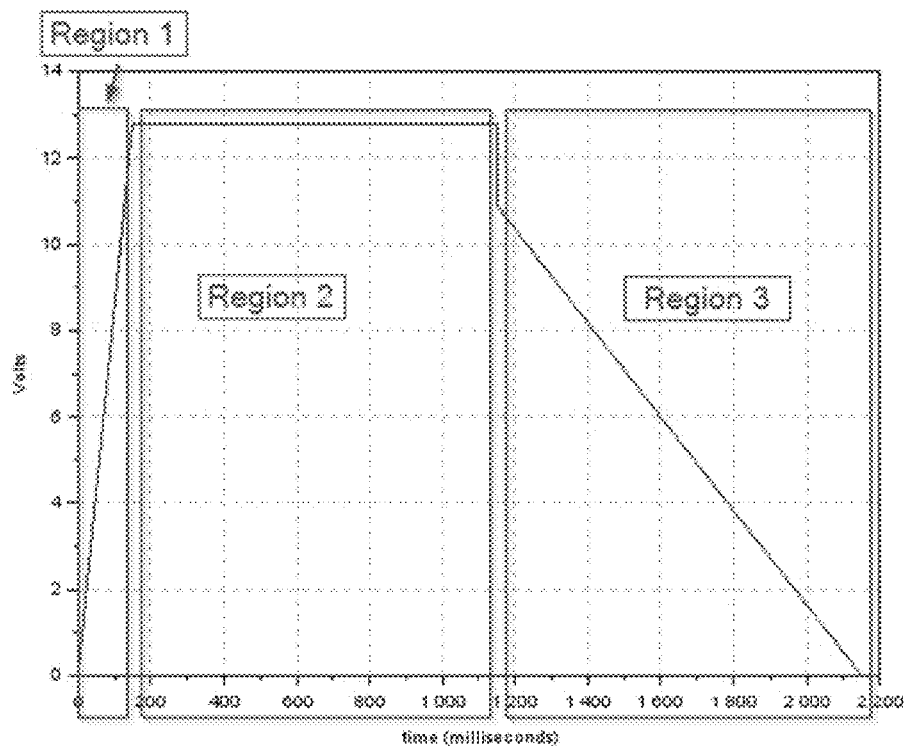
FIG. 6B is a graph showing an embodiment of Regions used in a time vs. voltage graph to calculate chemical output according to the invention

Parameters measured and stored for reference during a calibration cycle may include information, including that shown in FIG. 6B, such as;

ramp up rate of the motor voltage;

steady state motor voltage as seen in Region 2;

duration of steady state motor voltage as seen in Region 2;

magnitude of any voltage discontinuity seen when transitioning from Region 2 to Region 3;

voltage slope seen in Region 3; and volume of fluid pumped during calibration.

The data measured forms a model of the pumping system which will be subsequently used by controller 140 to calculate the adjusted run time or RPM of the pump based on the required injection rate.

During routine injection process the state of the power source 110, such as a battery, may change as described previously. This dynamic state is measured by measuring and monitoring the voltage of the supply and/or the voltage applied to motor 100. Changes to the voltage and any of the parameters collected during calibration are used in the calculation of the duration to turn ON pump 120. It is important to note that the ON time required can be a simple linear scaling of voltage, but for enhanced accuracy can be obtained by using the relative proportions of each operating Region as discussed above; with Regions 1 and 3 contributing a parabolic relationship of V*s relative to battery voltage.

In addition to injection control based on V*s management this embodiment of the invention uses enhanced injection control by observing changes in motor load which in turn changes the calibration factor previously recorded. This is achieved by observing the instantaneous drop in motor voltage at the boundary of Regions 2 and 3 in FIG. 6B. This drop in voltage across the motor provides an indication of motor load IR losses and reveals differences in the operating point relative to when the calibration data was collected. In addition to observing this instantaneous drop in motor voltage it is also possible to observe changes in the slope of Region 3 to determine changes to the motor load and further correct the calibration factor.

Voltage, Current and Frequency Example

Expanding upon the above embodiment, observing other electrical parameters such as motor current, and in the case of AC operation, observing motor frequency, can further improve the accuracy of injection.

By measuring the motor current, the motor load can be further refined. This motor load information is used to refine the estimated motor RPM and therefore refine the calibration factor which expresses how productive pump 120 is under the current loads. This refinement to the calibration factor allows the system to dynamically adapt to changing conditions.

For AC motors or other systems of a periodic nature (such as brushless DC, synchronous or asynchronous motors, solenoid motors, etc.) it is also possible to monitor frequency as another parameter. This parameter further enhances the knowledge of RPM and ultimately the number of pumped strokes. The electrical frequency is the more obvious observation but in the case of asynchronous systems the mechanical frequency can also be determined via observing the electrical parameters. Combining the mechanical frequency of operation and the previously described electrical parameters allows for enhancing the precision of the injection process.

Electrical measurements can be taken and received continuously or periodically. In an embodiment of the invention, Analog to Digital Converter 900 may make a discrete conversion in a moment in time, which is used to determine if a variation has occurred. Alternatively the measurements can also be taken frequently and averaged or filtered to reduce noise.

In another alternative embodiment, electrical measurements 150 may be taken periodically before each duty cycle if the system is correcting for supply voltage and used to determine variations in the duty cycle. In a further alternative embodiment electrical measurements 150 can be taken periodically during each duty cycle and any needed corrections applied to the following duty cycle. In yet another alternative embodiment, electrical measurements 150 may be taken during a duty cycle and used in real time to make any needed corrections in the current duty cycle.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

We claim:

1. A method of maintaining consistent output for a pump powered by an electric motor, the method comprising:
   sending an electrical measurement of power applied to the motor to a controller;
   determining if the electrical measurement indicates a power variation; and
   changing a parameter of output from the motor to compensate for the power variation by changing a duty cycle of the motor.

2. The method of claim 1, wherein the pump is a chemical pump.

3. The method of claim 1, wherein the electric motor is powered by a battery.

4. The method of claim 3, wherein the battery is charged by solar.

5. The method of claim 1, wherein the electrical measurement is a voltage measurement.

6. The method of claim 1, wherein the electrical measurement is a current measurement.

7. The method of claim 1, wherein the electrical measurement is a frequency waveform.

8. The method of claim 1, wherein the motor comprises a motor selected from the group consisting of: DC motor; permanent magnet synchronous motor; and brushless DC motor.

9. The method of claim 1, wherein the duty cycle changed is an ON/OFF duty cycle.

10. The method of claim 1, wherein the duty cycle changed is a pulse width modulation duty cycle.

11. The method of claim 1, further comprising:
    including a ramp down period of the motor when determining the parameter change.

12. The method of claim 1, further comprising:
    including a ramp up period of the motor when determining the parameter change.

13. The method of claim 1, wherein the controller comprises an analog to digital converter to convert the electrical signal to a digital signal.

14. The method of claim 1, further comprising calibrating the motor to obtain a calibration factor and using the calibration factor when determining if a power variation has occurred.

15. A pumping system, comprising:
    a pump;
    an electric motor configured to power the pump; and
    a controller configured to receive an electrical measurement regarding power input to the motor, to determine if the electrical measurement indicates a power variation; and to change a parameter of output from the motor to compensate for the power variation by changing a duty cycle of the motor.

16. The system of claim 15, wherein the electrical measurements are voltage measurements.

17. The system of claim 15, wherein the electrical measurements are current measurements.

18. The system of claim 15, wherein the electrical measurements are frequency waveforms.

19. The system of claim 15, wherein the duty cycle changed is an ON/OFF duty cycle.

20. The system of claim 15, wherein the duty cycle changed is a pulse width modulation duty cycle.

21. The system of claim 15, wherein the controller is further configured to include a ramp down period of the motor when determining the parameter change.

22. The system of claim 15, wherein the controller is further configured to include a ramp up period of the motor when determining the parameter change.

23. The system of claim 15, wherein the controller is further configured to use a calibration factor when determining if the power variation has occurred.

24. A method of maintaining consistent output for a pump powered by an electric motor, the method comprising:
    sending an electrical measurement of power applied to the motor to a controller;
    determining if the electrical measurement indicates a power variation; and
    changing a parameter of output from the motor to compensate for the power variation by changing a duty cycle of the motor, wherein the motor is selected from the group consisting of:
    DC motor, permanent magnet synchronous motor, and brushless DC motor.

* * * * *